(12) United States Patent
Maurer et al.

(10) Patent No.: US 8,916,511 B2
(45) Date of Patent: Dec. 23, 2014

(54) POLYSILOXANES HAVING QUATERNARY AMMONIUM GROUPS AND USE THEREOF

(75) Inventors: Tobias Maurer, Velbert (DE); Michael Ferenz, Essen (DE)

(73) Assignee: Evonik Degussa GmbH, Essen (DE)

( * ) Notice: Subject to any disclaimer, the term of this patent is extended or adjusted under 35 U.S.C. 154(b) by 65 days.

(21) Appl. No.: 13/389,854

(22) PCT Filed: Aug. 17, 2010

(86) PCT No.: PCT/EP2010/061968
§ 371 (c)(1),
(2), (4) Date: Feb. 10, 2012

(87) PCT Pub. No.: WO2011/032797
PCT Pub. Date: Mar. 24, 2011

(65) Prior Publication Data
US 2012/0168664 A1   Jul. 5, 2012

(30) Foreign Application Priority Data
Sep. 15, 2009 (DE) .................. 10 2009 029 450

(51) Int. Cl.
*C11D 9/36* (2006.01)
*D06M 15/647* (2006.01)
*C08G 77/38* (2006.01)
*D06M 15/643* (2006.01)
*C08G 77/388* (2006.01)

(52) U.S. Cl.
CPC ........... *C08G 77/388* (2013.01); *D06M 15/647* (2013.01); *C08G 77/38* (2013.01); *D06M 2200/50* (2013.01); *D06M 15/6436* (2013.01)
USPC ........... 510/329; 510/276; 510/287; 510/322; 510/327; 510/343; 510/347; 510/417; 510/466; 510/504; 510/515

(58) Field of Classification Search
USPC ......... 510/276, 287, 322, 327, 329, 343, 347, 510/417, 466, 504, 515
See application file for complete search history.

(56) References Cited

U.S. PATENT DOCUMENTS

| | | | | |
|---|---|---|---|---|
| 5,925,341 | A * | 7/1999 | Cervantes et al. | 424/78.03 |
| 6,242,554 | B1 * | 6/2001 | Busch et al. | 528/28 |
| 6,258,367 | B1 * | 7/2001 | Dupuis | 424/401 |
| 7,598,334 | B2 | 10/2009 | Ferenz et al. | |
| 7,605,284 | B2 | 10/2009 | Brueckner et al. | |
| 7,727,599 | B2 | 6/2010 | Doehler et al. | |
| 7,776,989 | B2 | 8/2010 | Ferenz et al. | |
| 7,825,207 | B2 | 11/2010 | Ferenz et al. | |
| 7,834,122 | B2 | 11/2010 | Ferenz et al. | |
| 7,838,603 | B2 | 11/2010 | Schwab et al. | |
| 7,855,265 | B2 | 12/2010 | Thum et al. | |
| 7,893,128 | B2 | 2/2011 | Busch et al. | |
| 7,964,694 | B2 | 6/2011 | Ferenz et al. | |
| 8,030,366 | B2 | 10/2011 | Ferenz et al. | |
| 2005/0255073 | A1 | 11/2005 | Sockel et al. | |
| 2006/0155090 | A1 | 7/2006 | Ferenz | |
| 2007/0059539 | A1 | 3/2007 | Doehler et al. | |
| 2007/0197678 | A1 | 8/2007 | Cavaleiro et al. | |
| 2008/0173451 | A1 * | 7/2008 | Reddy et al. | 166/308.2 |
| 2008/0305065 | A1 | 12/2008 | Ferenz et al. | |
| 2010/0031852 | A1 | 2/2010 | Herrwerth et al. | |
| 2010/0034765 | A1 | 2/2010 | Herrwerth et al. | |
| 2010/0036011 | A1 | 2/2010 | De Gans et al. | |
| 2010/0055760 | A1 | 3/2010 | Thum et al. | |
| 2010/0056649 | A1 | 3/2010 | Henning et al. | |
| 2010/0081763 | A1 | 4/2010 | Meyer et al. | |
| 2010/0248325 | A1 | 9/2010 | Eckstein et al. | |
| 2010/0266651 | A1 | 10/2010 | Czech et al. | |
| 2011/0042004 | A1 | 2/2011 | Schubert et al. | |
| 2011/0046305 | A1 | 2/2011 | Schubert et al. | |
| 2011/0070175 | A1 | 3/2011 | Herrwerth et al. | |
| 2011/0091399 | A1 | 4/2011 | Meyer et al. | |
| 2011/0230619 | A1 | 9/2011 | Kuppert et al. | |
| 2011/0230633 | A1 | 9/2011 | Ferenz et al. | |
| 2011/0251070 | A1 | 10/2011 | Poffenberger et al. | |
| 2012/0010302 | A1 | 1/2012 | Hartung et al. | |
| 2012/0029090 | A1 | 2/2012 | Brugger et al. | |
| 2012/0093900 | A1 * | 4/2012 | Khenniche et al. | 424/401 |

FOREIGN PATENT DOCUMENTS

| | | |
|---|---|---|
| DE | 10 2004 002 208 | 8/2005 |
| EP | 1 561 770 | 8/2005 |
| EP | 1 887 024 | 2/2008 |
| WO | 03 078504 | 9/2003 |
| WO | 2009 065644 | 5/2009 |

OTHER PUBLICATIONS

International Search Report Issued Sep. 30, 2010 in PCT/EP10/61968 Filed Aug. 17, 2010.
English translation of Chinese Search Report issued Mar. 19, 2014, in Chinese Patent Application No. 201080041059.5.

* cited by examiner

*Primary Examiner* — Charles Boyer
(74) *Attorney, Agent, or Firm* — Oblon, Spivak, McClelland, Maier & Neustadt, L.L.P.

(57) ABSTRACT

The invention relates to a novel branched polysiloxanes having quaternary ammonium groups of the general formula (I) as a softening agent for textile sheet materials and fibers, and to a method for the production and use thereof $M_a M^Q_b M^R_c D_d D^Q_e D^R_f T_g Q_h$ Formula (I).

15 Claims, No Drawings

POLYSILOXANES HAVING QUATERNARY AMMONIUM GROUPS AND USE THEREOF

The invention concerns novel multiply branched polysiloxanes having quaternary ammonium groups. It further concerns the use of these polymers as softeners for sheet materials such as for example wovens, tissue, nonwovens and/or fibers formed from natural and/or synthetic raw materials and/or leather.

Softeners for sheet materials, wovens, knits, nonwovens and/or fibers formed from natural and/or synthetic raw materials are substances that confer a soft silky hand on textile materials. Polysiloxanes having quaternary ammonium groups are particularly suitable. The ionic groups anchor the siloxane on the fiber via electrostatic forces of attraction. This reduces friction and the desired softener effect is obtained. When the siloxane is applied in the form of microemulsions, it can additionally penetrate into the fiber and endow it with inner softness and body.

Polysiloxanes having quaternary ammonium groups and their use as textile softeners are known from the patent literature. DE-B-14 93 384, for instance, describes structures wherein siloxanes are modified by pendant ammonium groups distributed randomly over the polymer. These compounds have the disadvantage that they do not possess pronounced silicone characteristics and have no observable efficacy as textile softeners.

Cationic silicones as described in EP 0 294 642 have distinctly more pronounced silicone characteristics. EP 0 294 642 describes structures wherein the quaternary functions attach terminally to a siloxane segment. A textile treated with compounds of this type does acquire good softness, but the siloxane is readily removed again from the treated textile, by washing for example, owing to the low substantivity of the siloxane on the textile. It would be desirable for the siloxane to remain on the textile after washing so that the softness is not lost.

The problem addressed by this invention is that of providing polysiloxanes that have quaternary ammonium groups, that are obtainable in good yields and that are also very useful as hydrophilic softeners for textiles and are also not readily washed off a textile.

The problem addressed by this invention is solved by branched organomodified polysiloxanes having more than three quaternary ammonium groups.

More particularly, the branched organomodified polysiloxanes of the present invention (which are also known as siloxane quats) impart a very good hydrophilic soft hand and also an enhanced durability on textiles. In addition, a high rebound elasticity and improved crease recovery on the part of a fabric thus finished must be counted as a further positive property.

Surprisingly, branched organomodified polysiloxanes were found to solve the problem.

The problem is solved by branched organomodified polysiloxanes having more than three quaternary ammonium groups.

The invention further provides branched organomodified polysiloxanes of the general formula I

  formula I where
M=$[R^1{}_3SiO_{1/2}]$, a=0 to 40, preferably 0 to 10, especially 0,
$M^Q$=$[R^2, R^1{}_2SiO_{1/2}]$, b=0 to 44, preferably 3 to 22, especially 4 to 16,
$M^R$=$[R^3 R^1{}_2SiO_{1/2}]$, c=0 to 40, preferably 0 to 10, especially 0,
D=$[R^1{}_2SiO_{2/2}]$, d=20 to 1000, preferably 50 to 600, especially 100 to 400,
$D^Q$=$[R^2, R^1SiO_{2/2}]$, e=0 to 50, preferably 0 to 10, especially 0,
$D^R$=$[R^3R^1SiO_{2/2}]$, f=0 to 50, preferably 0 to 10, especially 0,
T=$[R^1SiO_{3/2}]$, g=0 to 20, preferably 0 to 10,
Q=$[SiO_{4/2}]$, h=0 to 20, preferably 1 to 10, especially not less than 1,
$R^1$=independently identical or different linear or branched alkyl, aryl or alkaryl moieties of 1 to 30 carbon atoms, preferably hexadecyl, dodecyl, octyl, ethyl, methyl or phenyl, especially phenyl or methyl,
$R^2$=independently identical or different organic moieties bearing ammonium functions, especially identical or different moieties of the general formula II $$-R^4-R^5 \qquad \text{formula II}$$

where
$R^4$=independently identical or different divalent organic moieties, especially independently identical or different moieties selected from the group:

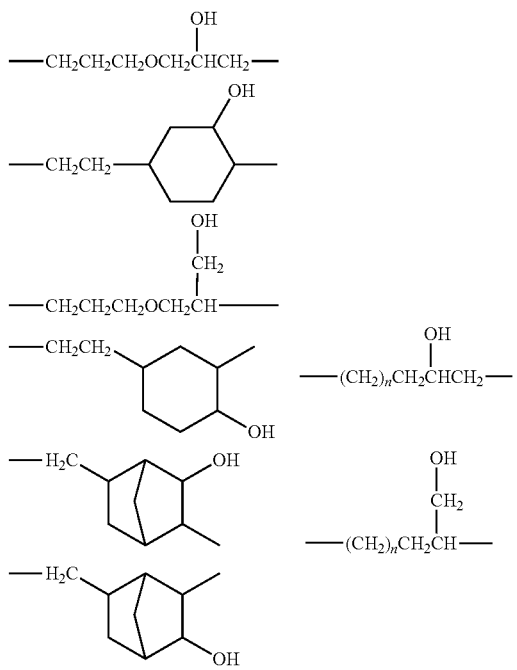

especially moieties selected from the group:

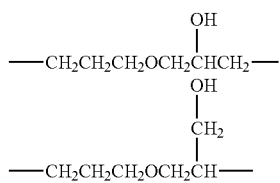

$R^5$=independently identical or different moieties selected from the group:

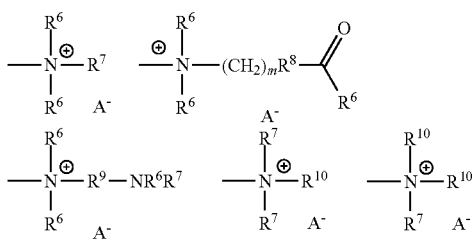

$A^-$=independently identical or different counter-ions to the positive charges on the quaternary nitrogen groups, preferably selected anions from the organic or inorganic acids HA generally known in the prior art, more preferably from acetic acid, lactic acid, aromatic carboxylic acids or HCl, $R^6$=independently identical or different alkyl moieties of 1 to 30 carbon atoms, preferably methyl, $R^7$=independently identical or different, saturated or unsaturated, branched or unbranched alkyl moieties of 1 to 30 carbon atoms, preferably stearyl, hexadecyl, dodecyl, undecylene, octyl, ethyl or methyl, $R^8$=independently identical or different moieties selected from the group O, NH or $NR^6$, $R^9$=independently identical or different branched and/or unbranched divalent hydrocarbon moieties, preferably —$(CH_2)_3$— and —$(CH_2)_2$—

$R^{10}$=independently identical or different polyether moieties, especially polyether moieties of the general formula III:

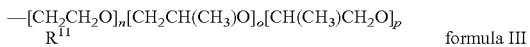

formula III where
n, o, p are each independently from 0 to 100
provided: n+o>1,
$R^{11}$=independently identical or different moieties from the group —$COR^1$, $R^1$ or H,
m=2 to 12, preferably 2 to 3, especially 3,
$R^3$=independently identical or different polyether moieties, especially identical or different polyether moieties of the general formula IV,

formula IV where
q=1 to 12, preferably 3 to 6, especially 3,
o, p, r, s=independently 0 to 100
provided o+p+r+s>1
Ph=phenyl,
with the proviso that the sum total of g and h is greater than 1, preferably the sum total of g and h is not less than 2 and more preferably the sum total of g and h is not less than 3,
and the further proviso that the sum total of b and e is greater than 3, preferably the sum total of b and e is not less than 3.5 and more preferably the sum total of b and e is not less than 4; and the further proviso that the sum total of a and b is greater than 3, preferably the sum total of a and b is not less than 3.5 and more preferably the sum total of a and b is not less than 4.

The polysiloxanes polymers of the present invention, hereinafter also referred to as siloxane quat(s), differ from those of the prior art by having a siloxane backbone with more than one branching unit. Products of this kind have surprisingly good usefulness as softeners for textiles. They are liquid despite their branching unit and are efficiently formulatable. Their soft hand is significantly better than siloxanes modified purely pendantly. Compared with α,ω-modified linear siloxanes, they have a significantly improved durability, and so they altogether have an improved profile of properties.

Compounds of this type are obtainable in various ways. One method of making consists for example in the following sequence of reactions: First, a branched SiH siloxane is prepared by equilibrating tri- or tetraalkoxysilanes with cyclic siloxanes and α,ω-SiH siloxanes and the alkoxy groups are hydrolyzed in the presence of water. Branched SiH-functional siloxanes form in the siloxane portion during the subsequent condensation. This process is described at length in WO 2009/065644 for example. The content of the above-cited patent literature insofar as it concerns the preparation of branched SiH siloxanes is hereby incorporated herein by reference to form part of the disclosure content of the present application.

Branched SiH siloxanes of this type can then be used to hydrosilylate epoxides containing a double bond (allyl glycidyl ether for example). The epoxy-functional siloxanes thus prepared can then be reacted with tertiary amines to form the corresponding branched polysiloxanes with quaternary ammonium groups that are in accordance with the present invention.

The invention accordingly further provides a process for preparing branched polysiloxanes having quaternary ammonium groups of the general formula I, wherein in a first step
a) a branched SiH siloxane is prepared by equilibrating tri- or tetraalkoxysiloxanes with cyclic siloxanes and α,ω-SiH siloxanes and the alkoxy groups are hydrolyzed in the presence of water, and in a second step during
b) the subsequent condensation branched SiH-functional siloxanes are formed in the siloxane portion, which are in a third step
c) hydrosilylated with epoxides (allyl glycidyl ether for example) containing a double bond and finally in a fourth step
d) the epoxy-functional siloxanes thus prepared are reacted with tertiary amines to form the corresponding branched polysiloxanes of formula I.

The invention further provides for the use of the compounds according to the invention which are obtainable by the process mentioned as optionally permanent softeners for sheet materials such as for example wovens, knits, nonwovens, tissue (paper fiber) and/or fibers formed from natural and/or synthetic raw materials and/or leather, while the softener may optionally also confer hydrophilic properties on sheet materials treated therewith.

The invention accordingly further provides for the use of the polysiloxanes of formula I where d=20 to 1000 as softeners for sheet materials, in particular textile sheet materials, for example wovens, knits, nonwovens, tissue (paper fiber) and/ or fibers formed from natural and/or synthetic raw materials and/or leather. Compounds of this type have not only high-level silicone characteristics to produce a pleasant hand but also a viscosity for aqueous formulation of such compounds. The viscosity of polysiloxanes of formula I is in the range up to about 25 000 mPa·s at 25° C.

The content in the aqueous formulations of the general formula I compound which is used according to the present invention is between 0.5% and 99% by weight, preferably between 3% and 70% by weight and particularly between 5% and 50% by weight, based on the entire formulation.

The branched polysiloxanes of the present invention can be used and optionally applied in the form of concentrates, compounds/emulsion concentrates, formulations and liquors obtained therefrom.

A person skilled in the art is familiar with the fact that the compounds are present in the form of a mixture having a distribution of the indices mentioned which is essentially governed by statistical laws.

Liquor denotes a usually aqueous liquid in which textiles are washed, bleached, dyed or impregnated. In this context, the term liquor is to be understood as meaning the totality of solvent (usually water) and all constituents contained (dissolved, emulsified or dispersed) therein such as for example dyes, emulsifiers and further auxiliaries.

The totality of constituents dissolved in the liquor is commonly also referred to as the solids content in that the solids content indicates the residue on drying after evaporation of volatile constituents (at about 100° C.-105° C.).

The quantity of components in a liquor is usually reported in g/l in the case of liquids or % (on weight of fabric).

A treatment liquor is very generally referred to in the textile sector as the bath (usually aqueous) in which (or with which) the fabric is finished with one or more (surface-active) substances.

In addition to the main systems of application, there are further forms of application, such as spraying, blade coating or roll coating, depending on the end use and hence product viscosity.

Mainly two systems are used for aqueous systems: Exhaustion in the case of substantive, i.e., cationic, products, where in principle like the fabric conditioner in the washing machine, the fabric is agitated in the liquor at specified temperature for a specified time. Subsequently, the liquor is "dropped" and the fabric is dried.

Padding in the case of substantive and nonsubstantive products, for example with a laboratory padder from Mat this (of the HVF type), where the fabric is led through the liquor and squeezed off between the rolls (akin to a mangle) to a residual moisture content and subsequently dried.

The invention accordingly further provides a concentrate, a compound/emulsion concentrate, a formulation or emulsion as defined hereinbelow.

A concentrate is the almost pure, about 90-100% by weight polysiloxane compound of formula I, to which only minimal amounts of solvents have been added—these are generally not soluble in water and also not self-emulsifiable.

Compound or emulsion concentrate contain 50-90% by weight and preferably 50-80% by weight of the polysiloxane compound, which as further constituents contain water and/or solvents selected from the group of glycols, branched and/or unbranched alcohols and/or alkyl ethers having 1 to 6 carbon atoms and optionally one or more than one nonionic emulsifier, for example an alcohol ethoxylate having 3-25 ethylene oxide units. Compounds/emulsion concentrates are generally soluble/self-emulsifiable in water.

Formulations and/or (aqueous) emulsions contain 5-20% by weight of the polysiloxane of the present invention, solvents, emulsifiers (including cationic or amphoteric), water. The solids content of these formulations or emulsions is generally about 10-40% by weight.

The aforementioned concentrates, compounds and/or formulations/emulsions are diluted in water in the production/finishing facilities to produce the (application) liquors (application/finishing baths). Typical liquor concentrations in the case of application by padding are for example 5-80 g of formulation/emulsion per liter of liquor solution or application liquor.

Depending on the siloxane scaffold and its chain length, most commercially available polysiloxanes having quaternary ammonium groups are not self-emulsifiable in water and need additions of emulsifiers and/or solvents to incorporate them into an aqueous formulation.

Emulsifiers used are typically fatty alcohol ethoxylates having degrees of ethoxylation between 3 and 12 and are used in the range from 5:1 to 1:1 for the ratio of softener to fatty alcohol ethoxylate.

Useful solvents include for example high-boiling glycols such as dipropylene glycol or butyldiglycol. Further embodiments and subjects of the invention are apparent from the claims, the disclosure content of which is fully and entirely part of the subject matter of this description.

The present invention's branched polysiloxanes having quaternary ammonium groups, processes for their production and their use will now be described in an exemplary manner without the invention being limited to these exemplary embodiments.

Where ranges, general formulae or classes of compounds are indicated in what follows, they shall encompass not just the corresponding ranges or groups of compounds that are explicitly mentioned, but also all sub-ranges and sub-groups of compounds which are obtainable by extraction of individual values (ranges) or compounds.

The index numbers shown in the formulae recited herein and the value ranges for the indicated indices are therefore to be understood as the average values of the possible statistical distribution of the actual existing structures and/or mixtures thereof. This also holds for structural formulae actually reproduced exactly as such, like for formula I for example.

Determining the SiH Value:

The SiH value is determined by reacting the SiH functions of a sample with a 3-5% by weight butanolic sodium butoxide solution and the resulting hydrogen is collected in a burette. The volume of hydrogen formed can be used to determine the level of hydrogen attached to the silicon.

Determining the Epoxy Number:

A quantity of a sample is weighed into the Erlenmeyer flask depending on the likely epoxy value. Then, a volumetric pipette is used to add 40 mL of a 0.1 mol/L hydrochloric acid solution in dioxane. The quantity of sample must be chosen such that the amount of hydrochloric acid used is distinctly in excess relative to the epoxy functions. The flask is closed and agitated until the sample has completely dissolved. The samples are then allowed to react at room temperature for 15 minutes. Thereafter the flasks are made up to a volume of about 100 mL with methanol. After addition of a few drops of kresol red indicator solution in THF, the mixture is titrated against 0.1 mol/L of ethanolic potassium hydroxide solution. On addition of the indicator, the solution turns brick red, only to take on a lemon yellow color shortly before reaching the end-point. The end-point of the titration is reached when a renewed color change to bluish violet takes place. Concurrently to the samples, two blank values are determined in exactly the same way as the samples, but they do not contain any sample material. The epoxy number can be determined from the difference in HCl solution consumption between the sample analysis and the blank value.

Determining the Siloxane Quat Nitrogen Content:

Quaternary nitrogen is determined by potentiometric titration with a dodecyl sulfate solution as titrant using an electrode combination of a specific, solvent-resistant sensor electrode, for example Surfactrode Resistant (Metrohm AG) and a reference electrode Ag/AgCl cartridge double junction (Metrohm AG). A sample is weighed out into a titration beaker accurate to 0.1 mg. After dissolving in 10 mL of MIBK, 10 mL of denatured ethanol and 0.2 mL of TEGO® add (from Metrohm AG Article No. 6.2317.100) are added, 10 mL of pH 10 buffer solution are added and 80 mL of distilled water are added for dilution. This is followed by titration against 0.005 mol/L of dodecyl sulfate sodium salt solution using the titroprocessor. The quaternary nitrogen content is calculated having regard to the consumption of 0.005 mol/L of dodecyl sulfate sodium salt solution and the sample weight.

Determining the Viscosities:

Viscosities were measured in line with DIN 53019 using a Brookfield LVT rotary viscometer at 25° C.

EXAMPLES

Example 1

Preparing a Branched Polysiloxane Having Quaternary Ammonium Groups:

1st Stage:

28.5 g of methyltriethoxysilane, 1067 g of decamethyltetracyclosiloxane, and 105 g of an a,w-modified SiH siloxane having the formula $HSiMe_2O[SiMe_2O]_8SiMe_2H$ were mixed, admixed with 1.2 g of trifluoromethanesulfonic acid and stirred at 40° C. for two hours. Then, 8.6 g of water were added and allowed to react for one hour. Thereafter, 72 g of an acidic ion exchanger (Lewatit® K 2621, from Lanxess) were added and the mixture was stirred at 40° C. and 20 mbar for three hours during which volatiles were removed. The reaction mixture was finally filtered and the filtrate was neutralized with 24 g of $NaHCO_3$ and filtered again. The filtrate obtained was a branched SiH siloxane having an SiH hydrogen content of 0.0272% by weight.

2nd Stage:

333 g of the SiH siloxane obtained in the first stage were mixed with 13.6 g of 2-[(allyloxy)methyl]oxirane (allyl glycidyl ether) and heated to 70° C. Then, 10 ppm of Pt in the form of the Karstedt catalyst were added. An exothermic reaction ensued and raised the temperature of the reaction mixture to 84° C. This was followed by heating to 90° C. and a further two hours of stirring. Thereafter, the volatile constituents of the reaction mixture were removed at 130° C. in an oil pump vacuum to obtain a liquid, clear, slightly brownish epoxysilane having an epoxy oxygen content of 0.44% by weight.

3rd Stage:

40 g of isopropanol, 3.1 g of acetic acid and 15.8 g of an amide-amine based on coconut fatty acid (CAS: 61790-62-3) were mixed with each other at room temperature. Then, 182 g of the epoxysilane obtained in the second stage were gradually added and the reaction mixture was heated to 80° C. After six hours of stirring, the volatile constituents were removed at 100° C. in an oil pump vacuum to obtain a clear, yellowish product having a viscosity of 1 200 mPa·s and a nitrogen content of 0.31% by weight.

Example 2

Preparing a Branched Polysiloxane Having Quaternary Ammonium Groups

2nd Stage:

222 g of SiH siloxane obtained in the first stage of Example 1 were mixed with 40.5 g of an allyl polyether of formula $CH_2=CHCH_2O(CH_2CH_2O)_{28}(CH_2CH(CH_3)O)_4H$ and heated to 70° C. Then 5 ppm of Pt were added in the form of the Karstedt catalyst. An exothermic reaction ensued and raised the temperature of the reaction mixture to 73° C. This was followed by heating to 90° C. and a further hour of stirring. Then, 6.0 g of 2-[(allyloxy)methyl]oxirane and a further 5 ppm of Pt in the form of the Karstedt catalyst were added. An exothermic reaction ensued and raised the temperature of the reaction mixture to 97° C. After stirring at 90° C. for two hours, the volatile constituents of the reaction mixture were removed at 130° C. in an oil pump vacuum to obtain a liquid, clear, slightly brownish epoxysilane having an epoxy oxygen content of 0.25% by weight.

3rd Stage:

32 g of isopropanol, 1.4 g of acetic acid and 7.3 g of an amide-amine based on coconut fatty acid (CAS: 61790-62-3) were mixed with each other at room temperature. Then, 147 g of the epoxysilane obtained in the second stage were gradually added and the reaction mixture was heated to 80° C. After six hours of stirring, the volatile constituents were removed at 100° C. in an oil pump vacuum to obtain a clear, yellowish product having a viscosity of 1 900 mPa·s and a nitrogen content of 0.19% by weight.

Use Examples

Formulation Examples

General Formulation:

5% to 50% by weight of the inventive polysiloxane with quaternary ammonium groups is introduced into a glass beaker equipped with a propeller stirrer under agitation. This is followed by the addition, one after the other, of 5% to 25% by weight of dipropylene glycol or butyldiglycol, 3% to 15% by weight of a fatty alcohol ethoxylate having a degree of ethoxylation of 6 under agitation. Finally, the mixture is made up with water to 100% by weight.

Formulation 1—According to the Invention:

20 parts of the inventive polysiloxane with quaternary ammonium groups from Example 1 are initially charged to a glass beaker with a propeller stirrer under agitation. This is followed by the addition, one after the other, of 10 parts of dipropylene glycol, 10 parts of a fatty alcohol ethoxylate having a degree of ethoxylation of 6 under agitation. Finally, the mixture is made up with water to 60 parts to obtain a clear to opaque, low-viscosity formulation.

Formulation 2—According to the Invention:

The procedure of preparing formulation 1 was repeated to prepare formulation 2 from inventive example 2.

Formulation 3—not According to the Invention:

A microemulsion as per formulation 1 with a commercially available polyether siloxane, Tegopren® 5884, having a solids content of 10% by weight.

Formulation 4—not According to the Invention:

A commercially available microemulsion of an unbranched, linear polysiloxane with quaternary ammonium groups, Tegopren® 6924, having a solids content of 20% by weight.

Formulation 5—not According to the Invention:

A commercially available dispersion of an organic softener, Rewoquat® WE 18, having a solids content of 7% by weight. This softener is silicon free and represents a typical esterquat.

Application Examples

To verify the hand and also the hydrophilicity of the present invention, products consisting of natural fibers were finished using the following process:

Padding Process:

To examine the softness conferred by each emulsion, knit cotton fabric (160 g/m$^2$) and terry cotton fabric (400 g/m$^2$) were padded with a liquor containing in each case 20 g/l of the corresponding emulsion, squeezed off to a wet pick-up of about 100% by weight and dried at 130° C. for three minutes.

To examine the hydrophilicity, woven cotton fabric (200 g/m$^2$) were padded with a liquor containing in each case 50 g/l of the corresponding emulsion and squeezed off to a wet pick-up of about 100% by weight and dried at 130° C. for three minutes.

Test Methods:

Hand Assessment:

Fabric hand was assessed by an experienced team which assessed the anonymized hand samples, of the knit and terry fabrics finished with the emulsions, with the aid of a hand panel test. The hand samples of knit fabric additionally included an untreated sample not overtly labeled.

Hydrophilicity Testing:

Hydrophilicity testing was performed using the test method for measuring the height of rise of water in line with German standard specification DIN 53924. The finished woven cotton test fabric is cut into five strips each 25 cm in length and 1.5 cm in width, which are marked on the side with a water-soluble pen and secured in a taut perpendicular position, but without tension, to a holder. The holder is subsequently placed for five minutes in a water bath such that 2 cm of the strips are in the water. The water-soluble marking serves to better make out the height of rise as a result of the color spreading on wetting with water. After the holder has stood outside the water bath for 10 minutes, the height of rise is read off in cm and assessed against the blank values (height of rise of untreated cotton strip×cm=100%) and reported as a % age of the blank value.

Washing Operation:

The washing operations were performed in a commercially available washing machine, Miele Novotronic W 918, with coloreds wash without prewash at 40° C. using wfk standard laundry detergent IECA base and 3 kg of cotton ballast fabric. The fabric thus treated was finally dried at room temperature for 12 hours.

The test results for softness are reported in Tables 1 and 2 and for hydrophilicity in Table 3.

TABLE 1

Softness assessment on knit cotton after application by padding

|  | before washing | after 1st wash | after 3rd wash | after 5th wash |
|---|---|---|---|---|
| Formulation 1 according to invention | +++ | +++ | ++ | + |
| Formulation 2 according to invention | +++ | ++ | o | o |
| Formulation 3 not according to invention | + | o | − | − |
| Formulation 4 not according to invention | ++ | + | o | − |
| Formulation 5 not according to invention | + | o | − | − |
| Untreated | − | − | − | − |

+++ excellent,
++ very good,
+ good,
o satisfactory,
− poor

TABLE 2

Softness assessment on terry cotton after application by padding

|  | before washing | after 1st wash | after 3rd wash | after 5th wash |
|---|---|---|---|---|
| Formulation 1 according to invention | +++ | +++ | ++ | + |
| Formulation 2 according to invention | ++ | + | o | − |
| Formulation 3 according to invention | o | − | − | − |
| Formulation 4 not according to invention | +++ | + | o | − |
| Formulation 5 not according to invention | + | o | − | − |
| Untreated | − | − | − | − |

+++ excellent,
++ very good,
+ good,
o satisfactory,
− poor

TABLE 3

Assessment of water absorption by woven cotton after application by padding

| Fabric type of treated cotton | Height of rise in % of blank value |
|---|---|
| Formulation 1 - according to invention | 84.0 |
| Formulation 2 - according to invention | 88.3 |
| Formulation 3 - not according to invention | 92.1 |
| Formulation 4 - not according to invention | 83.5 |

TABLE 3-continued

Assessment of water absorption by woven cotton after application by padding

| Fabric type of treated cotton | Height of rise in % of blank value |
|---|---|
| Formulation 5 - not according to invention | 77.0 |
| Untreated | 100.0 |

The results of Table 3 show an excellent water absorption for the woven cotton fabrics treated with the formulations according to the invention which amounts to above 80% of the height of rise for the untreated sample. This evidences the enhanced hydrophilicity of formulations according to the present invention, especially over formulation 4, which is not in accordance with the present invention, the untreated siloxane and the silicon-free formulation 5. The results of formulations 3 and 4 are admittedly similar or actually superior with regard to water absorption to those which are in accordance with the present invention, but with these formulations the durable softness is significantly worse, as can be seen from Table 1.

Elucidation:

The result is a soft, very fluffy and silky hand for the fabric finished with the products of the present invention (formulation 1 for example), which essentially survives even repeated washing. Especially on smooth types of fabric (such as the knit fabric for example) the products according to the invention exhibit excellent hand compared with commercially available products. The branched polysiloxane with quaternary ammonium groups of Example 1 exhibits distinctly improved durability over 5 washes, which is reflected in a relatively unchanged good hand assessment after the first wash. In addition, the fabric thus finished exhibited high rebound elasticity and improved crease recovery properties. The additional polyether modification in formulation 2 compared with formulation 1 moreover combines an excellent or very good hand with an improved water absorption of 88.3% versus 84.0% for the treated fabric.

What is claimed is:

1. A branched organomodified polysiloxane comprising more than three quaternary ammonium groups and having formula I:

$$M_a M^Q_b D_d D^Q_e T_g Q_h \quad (I),$$

wherein
M is $R^1_3SiO_{1/2}$, and a is 0 to 40,
$M^Q$ is $R^2 R^1_2 SiO_{1/2}$, and b is 0 to 44,
D is $R^1_2 SiO_{2/2}$, and d is 20 to 1000,
$D^Q$ is $R^2 R^1 SiO_{2/2}$, and e is 0 to 50,
T is $R^1 SiO_{3/2}$, and g is 0 to 20,
Q is $SiO_{4/2}$, and h is 0 to 20,
each $R^1$ is independently a linear or branched alkyl, aryl, or alkaryl moiety comprising 1 to 30 carbon atoms,
each $R^2$ is independently an organic moiety comprising an ammonium function,
wherein a sum of g and h is greater than 1, a sum of b and e is not less than 3, and a sum of a and b is greater than 3.

2. The polysiloxane of claim 1, wherein a sum of g and h is greater than 2.

3. The polysiloxane of claim 1, wherein $R^2$ is a moiety of formula II:

$$-R^4-R^5 \quad (II),$$

wherein
each $R^4$ is independently a divalent organic moiety,
each $R^5$ is independently a moiety selected from the group consisting of:

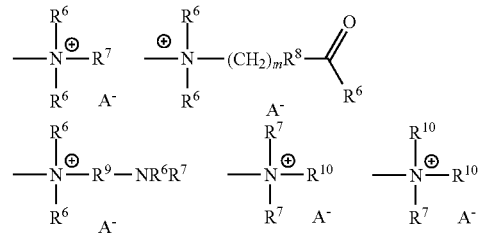

wherein
each $A^-$ is independently a counter-ion to the positive charge on the quaternary nitrogen group,
each $R^6$ is independently an alkyl moiety comprising 1 to 30 carbon atoms,
m is 2 to 12,
each $R^7$ is independently a saturated or unsaturated, branched or unbranched alkyl moiety comprising 1 to 30 carbon atoms,
each $R^8$ is independently O, NH, or $NR^6$,
each $R^9$ is independently at least one selected from the group consisting of a branched divalent hydrocarbon moiety and an unbranched divalent hydrocarbon moiety,
each $R^{10}$ is independently a polyether moiety, and
each $R^{11}$ is independently $-COR^1$, $R^1$, or H.

4. The polysiloxane of claim 3, wherein each $R^4$ is independently a moiety selected from the group consisting of:

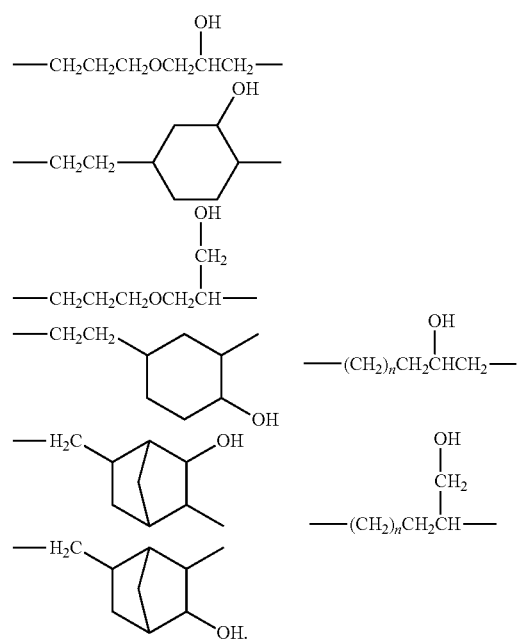

5. The polysiloxane of claim 3, wherein $R^{10}$ is a polyether moiety of formula III:

$$-[CH_2CH_2O]_n[CH_2CH(CH_3)O]_o[CH(CH_3)CH_2O]_p$$
$$R^{11} \quad (III),$$

wherein
n, o, p are each independently from 0 to 100, provided n+o>1.

6. The polysiloxane of claim 1, wherein a sum of g and h is not less than 2 and h is not less than 1.

7. The polysiloxane of claim 1, wherein a sum of a and b is not less than 4.

8. A process for preparing the branched polysiloxane of claim 1, the process comprising:
   a) equilibrating a tri-alkoxysilane or tetraalkoxysilane with a cyclic siloxane and an α, ω-SiH siloxane, and hydrolyzing the alkoxy groups in the presence of water, to obtain a first branched SiH-functional siloxane;
   b) subsequently, condensating the first branched SiH-functional siloxane, to obtain a second SiH-functional siloxane;
   c) hydrosilylating the second branched SiH functional siloxane with an epoxide comprising a double bond, to obtain an epoxy-functional siloxane;
   d) reacting the epoxy-functional siloxane with a tertiary amine, to form the branched polysiloxane.

9. A process for softening at least one material selected from the group consisting of a sheet material and a fiber, the process comprising:
   contacting the compound of claim 1 with the at least one material.

10. A process for softening at least one material selected from the group consisting of a sheet material and a fiber, the process comprising:
   contacting the polysiloxane of claim 1, wherein d is 20 to 1000, with the material,
   wherein the sheet material is at least one textile sheet material selected from the group consisting of a woven, a knit, and a nonwoven, and
   the fiber is at least one selected from the group consisting of tissue (paper fiber), a fiber formed from at least one selected from the group consisting of a natural material, and a synthetic raw material, and leather.

11. A concentrate, comprising:
   about 90% to 100% by weight of the polysiloxane of claim 1.

12. An emulsion concentrate comprising:
   50% to 90% by weight of the polysiloxane of claim 1.

13. A formulation, comprising:
   5% to 20% by weight of the polysiloxane of claim 1.

14. An aqueous emulsion, comprising:
   5 to 20% by weight of the polysiloxane of claim 1.

15. The polysiloxane of claim 2, wherein a sum of g and h is not less than 2 and h is not less than 1.

* * * * *